United States Patent
Matsuda

[11] Patent Number: 6,062,659
[45] Date of Patent: May 16, 2000

[54] AUTOMATIC BRAKE SYSTEM FOR VEHICLE

[75] Inventor: Shohei Matsuda, Wako, Japan

[73] Assignee: Honda Giken Kogyo Kabushiki Kaisha, Tokyo, Japan

[21] Appl. No.: 09/081,226

[22] Filed: May 20, 1998

[30] Foreign Application Priority Data

May 20, 1997 [JP] Japan ..................... 9-129636

[51] Int. Cl.[7] ........................................ B60T 8/72
[52] U.S. Cl. .................... 303/160; 303/155; 303/171; 364/426.025; 701/80
[58] Field of Search ..................... 180/167–169; 303/146, 155, 160, 166, 171, 172; 364/426.016, 426.025–426.028; 701/26, 79, 80

[56] References Cited

U.S. PATENT DOCUMENTS

| | | | |
|---|---|---|---|
| 5,651,593 | 7/1997 | Shitani et al. | 303/190 |
| 5,814,718 | 9/1998 | Andresen et al. | 73/9 |
| 5,854,987 | 12/1998 | Sekine et al. | 701/41 |
| 5,984,435 | 11/1999 | Tsukamoto et al. | 303/191 |

FOREIGN PATENT DOCUMENTS 6-281471  10/1994  Japan .

Primary Examiner—Chris Schwartz
Attorney, Agent, or Firm—Arent Fox Kintner Plotkin & Kahn PLLC

[57] ABSTRACT

A method and apparatus for automatic braking of a vehicle includes a number of elements which operate to control vehicle speed as the vehicle enters upcoming curves. A road shape detection device detects a road shape in a forward direction of a vehicle, and a proper vehicle travelling speed calculating device calculates a proper vehicle travelling speed in the forward direction, based upon the detected road shape. A vehicle speed detecting device detects a speed of the vehicle, and a deceleration setting device sets a vehicle deceleration. A brake control device is connected to the deceleration setting device, the vehicle speed detecting device, and the proper vehicle travelling speed calculating device, for reducing the vehicle speed according to the vehicle deceleration. A road surface friction detecting device detects a value corresponding to a frictional or slippery condition of the road surface. A deceleration correcting device increases the deceleration as the road surface becomes more slippery.

30 Claims, 4 Drawing Sheets

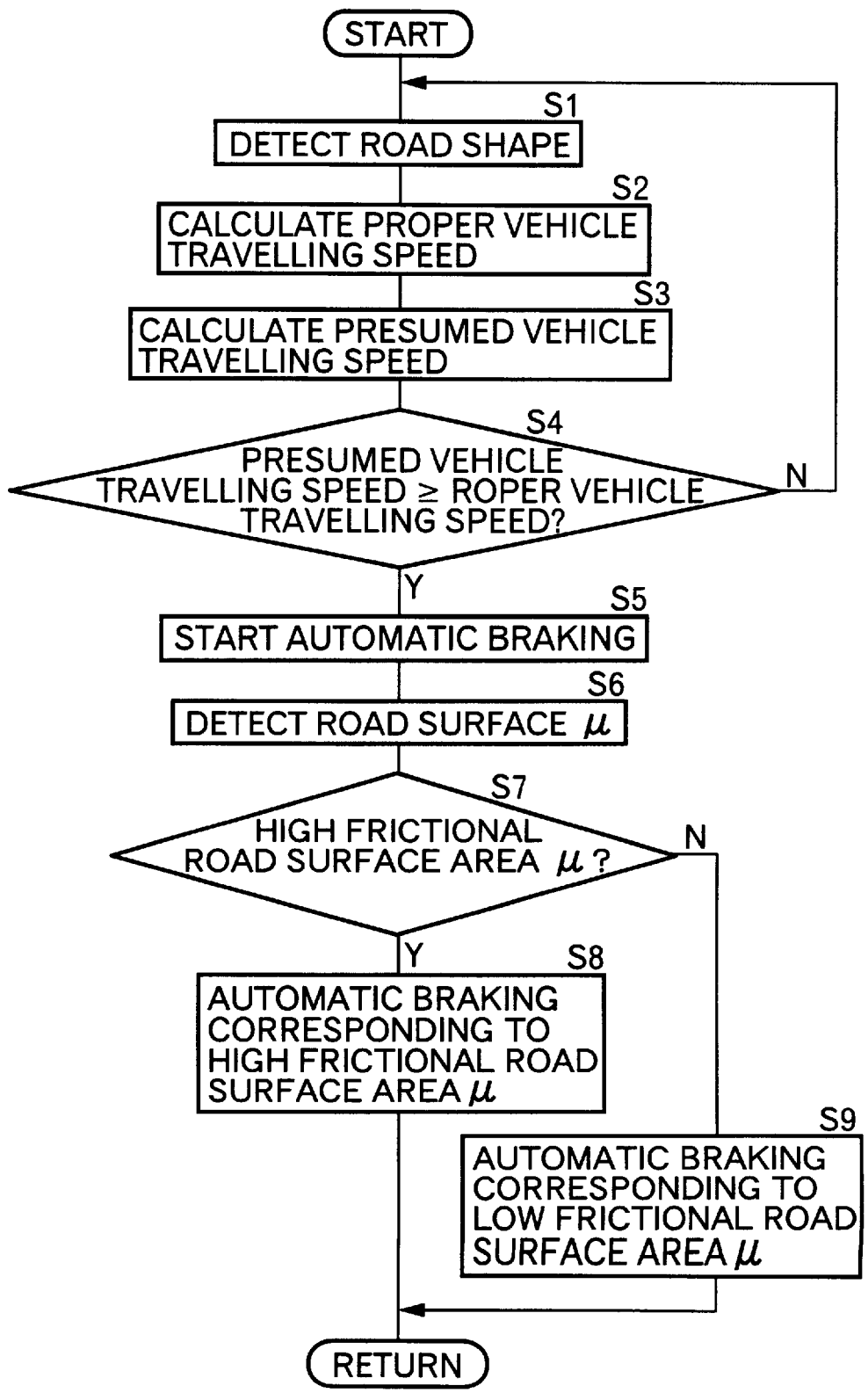

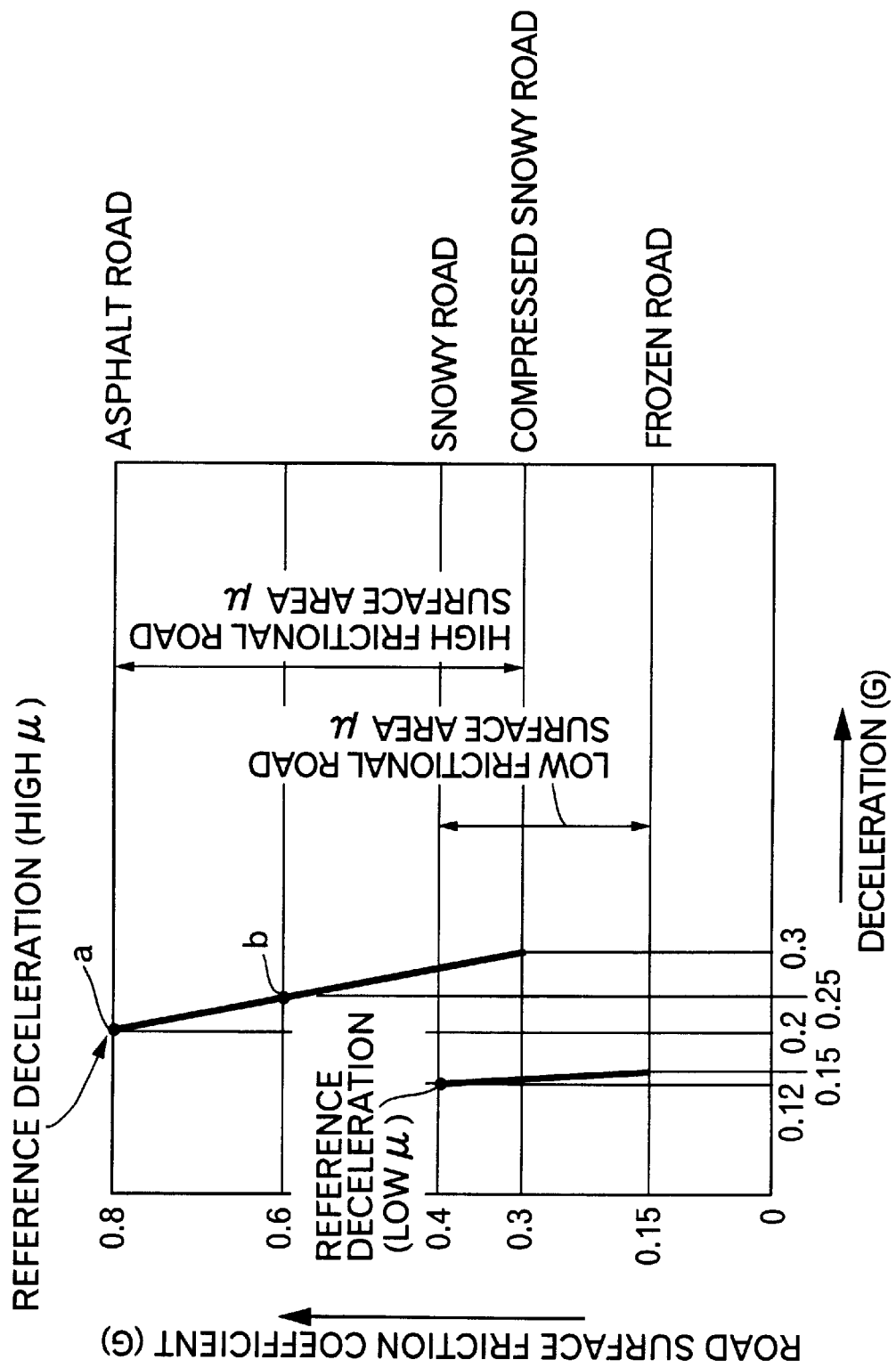

AUTOMATIC BRAKE SYSTEM FOR VEHICLE

BACKGROUND OF THE INVENTION

1. Field of the Invention

The present invention relates to an automatic vehicle brake system for automatically applying braking force when the actual vehicle speed is determined to be higher than a proper or appropriate vehicle travelling speed. The actual vehicle speed is compared with the proper vehicle travelling speed to ensure that the vehicle successively passes a forward curve or otherwise properly follows a roadway.

2. Description of the Related Art

An automatic brake system of the sort mentioned above for a vehicle is disclosed in Japanese Patent Application Laid-open No. 6-281471. The proper vehicle travelling speed which allows a vehicle to successfully negotiate a curve varies with the friction coefficient of the road surface. When the road surface is slippery, the proper vehicle travelling speed is low because marginal lateral acceleration decreases at the time of passing the curve. When the slippery road surface is detected, application of the brake is started in good time to lower the vehicle speed sufficiently when the vehicle enters the curve. When the slippery condition of the road surface is detected to be greater than the actual condition of the road surface through erroneous detection due to limitations in slippery or friction detection accuracy, automatic braking may be started well in advance of the curve, and the vehicle speed may be excessively decelerated when the vehicle enters the curve. The driver may be disturbed by this unexpected vehicle operating characteristic.

SUMMARY OF THE INVENTION

An object of the present invention made in view of the above-discussed situation is to provide an automatic brake system for a vehicle to ensure that the vehicle travels on a road in the forward direction, irrespective of the slippery condition or friction coefficient of the road surface, without causing unnecessarily disturbing operating characteristics when negotiating or encountering curves.

In order to accomplish this object, an automatic brake system for a vehicle according to the present invention includes road shape detecting means for detecting a road shape in a forward direction of a vehicle, and proper vehicle travelling speed calculating means connected to the road shape detecting means for calculating a proper vehicle travelling speed in the forward direction, based on the road shape detected. Vehicle speed detecting means are provided for detecting a vehicle speed, and deceleration setting means are provided for setting a vehicle deceleration. Brake control means connected to the deceleration setting means, the vehicle speed detecting means, and the proper vehicle travelling speed calculating means reduce the vehicle speed according to the vehicle deceleration to the proper vehicle travelling speed based on a result of comparing the proper vehicle travelling speed with the vehicle speed. Road surface friction detecting means are provided for detecting a value corresponding to a slippery condition of a road surface, and deceleration correcting means connected to the road surface friction detecting means are provided for increasing the deceleration as the road surface becomes slippery.

With the arrangement above, braking force is applied in order to reduce the vehicle speed at the predetermined deceleration, based upon a result of a comparison of the proper vehicle travelling speed with the actual vehicle speed to ensure that the vehicle can pass the road in the forward direction of the vehicle. At this time, appropriate correction is made so as to increase the deceleration as the frictional coefficient of road surface decreases, due to slippery conditions. When it is determined that the vehicle will have difficulty negotiating the curve at the current speed because the road surface is slippery, the vehicle speed is quickly corrected and lowered by increasing the deceleration to ensure that the vehicle can successfully negotiate the curve. Since the vehicle speed can be decelerated without advancing the application of the brake, the driver is prevented from experiencing an unnecessarily disturbing characteristic.

In another embodiment of the invention, area setting means connected to the deceleration setting means are provided for setting a range of values corresponding to a high frictional road surface area and a low frictional road surface area, in such a way that the range of values overlap and that the deceleration setting means sets the deceleration in the high frictional road surface area and the deceleration in the low frictional road surface area. With such an arrangement, it is possible to not only set the deceleration corresponding to the slippery condition of the road surface but also minimize influence derived from an error, if any, in setting the high frictional road surface area and the low frictional road surface area.

Another embodiment of the invention is such that an increase in the deceleration in the low frictional road surface area is set smaller than an increase in the deceleration in the high friction road surface area. With this arrangement, the correction of a deceleration which may not be appropriate is reducible on a low frictional road surface where an accurate road friction coefficient is difficult to detect because of a wide variation in the road surface friction coefficient. It is also possible to set the deceleration in the low frictional road surface area to a predetermined value. The correction of the deceleration which may not necessarily be appropriate can be obviated on a low frictional road surface where an accurate road surface friction coefficient is difficult to detect because of a wide variation in the road surface friction coefficient.

A further embodiment of the invention is one where the braking force of front wheels is set greater than the braking force of rear wheels when the road surface friction detecting means detects a slippery condition of the road surface. With this arrangement, the vehicle posture can be further stabilized by setting the braking force of front wheels greater than the braking force of rear wheels.

In another embodiment, the braking force of the rear wheels is set to zero. With this arrangement, the vehicle posture can be further stabilized when the brake is applied on the slippery road surface.

Another embodiment is one where the road shape detecting means detects the road shape based on road information prestored in a storage device, and the vehicle position detected by the vehicle position detecting means. With this arrangement, the road shape in the forward direction of the vehicle can accurately be detected by superposing the vehicle position on the stored road information.

Yet another embodiment is one where the road shape detecting means detects the road shape based on a road image obtainable from an imaging device which generates an image of the road ahead of the vehicle. With this arrangement, the road shape can accurately be detected, based on the road image obtained by the imaging device.

Another embodiment is one where the road shape detecting means detects the road shape based on the road information obtained from the information transmitting means installed on or in the roadway itself. With this arrangement, the road shape can accurately be detected based on the road information obtained from the information transmitting means.

BRIEF DESCRIPTION OF THE DRAWINGS

Referring to the accompanying drawings, a description is provided of a preferred embodiment of the invention, wherein:

FIG. 2 is a flowchart illustrating the function of the automatic brake system according to the embodiment of the invention;

FIG. 4 is a graph illustrating the correction of a deceleration corresponding to road friction coefficients.

DETAILED DESCRIPTION OF THE PREFERRED EMBODIMENT

Figure 1:
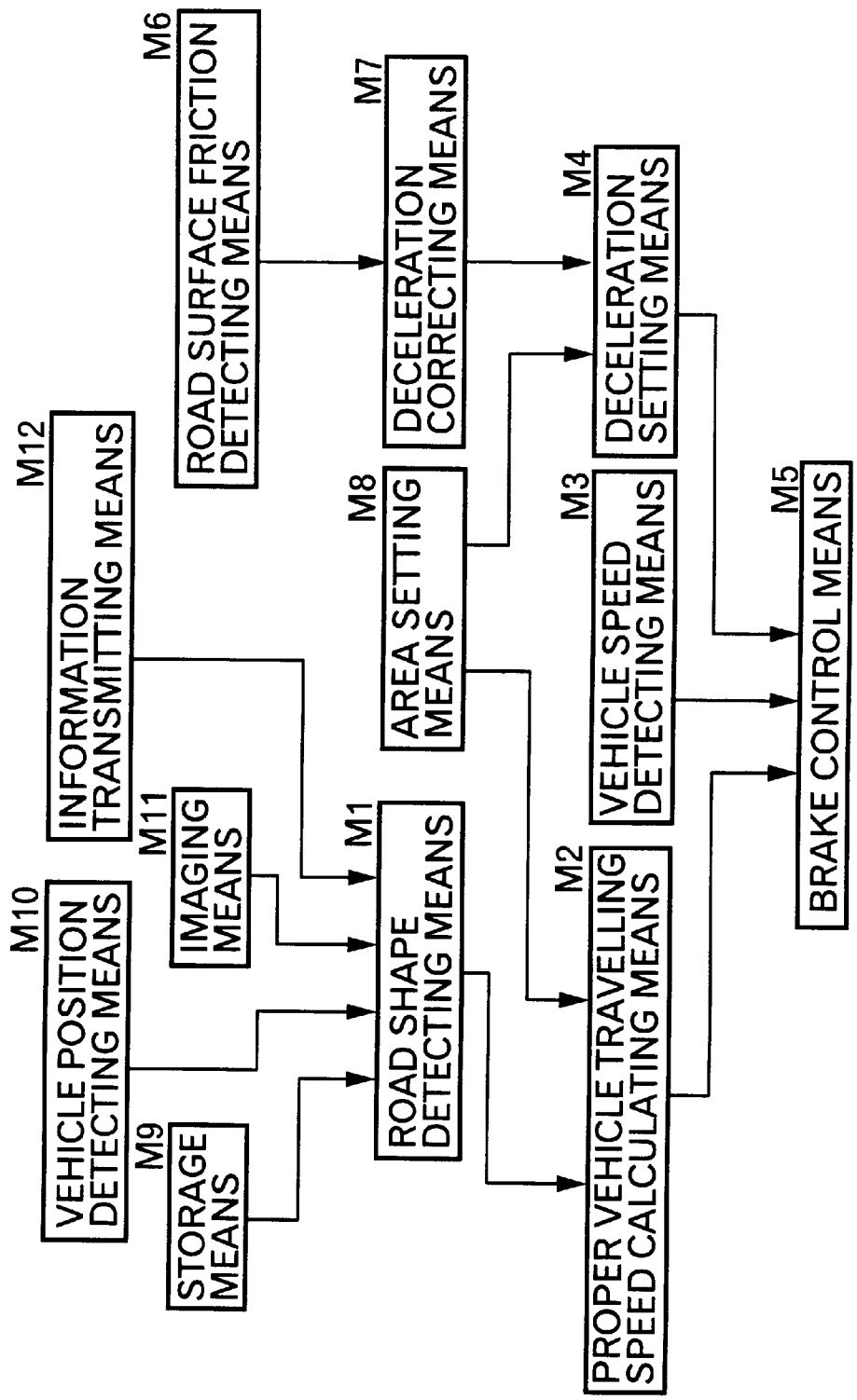
FIG. 1 is an overall block diagram of an automatic brake system according to an embodiment of the invention.

As shown in FIG. 1, an automatic brake system according to an embodiment of the invention for a vehicle comprises a road shape detecting means M1, a proper vehicle travelling speed calculating means M2, a vehicle speed detecting means M3, a deceleration setting means M4, a brake control means M5, a road surface friction detecting means M6, a deceleration correcting means M7, an area setting means M8, a storage means M9, a vehicle position detecting means M10, an imaging means M11, and an information transmitting means M12.

The road shape detecting means M1 detects a road shape including the curvature radius of a curve in a road in the direction in which a vehicle is moving forward, based on the road data stored in the storage means M9 in the form of CD-ROMs, IC cards or other computer-readable media. The vehicle position detecting means M10 detects vehicle position based on data from a satellite communication system or from a gyroscope. The road data can be expressed by the coordinates of many nodes disposed at predetermined intervals on a road so that the calculation of the road shape (e.g., the curvature radius of each node on the road) may be based the shape of the nodes.

The proper vehicle travelling speed calculating means M2 calculates a proper vehicle travelling speed to ensure that the vehicle successfully passes or negotiates the curve based on the curvature radius of the curve. The proper vehicle travelling speed is decelerated when the curvature radius of the curve is determined to require deceleration. When a curvature radius is small, it is difficult for a vehicle to pass through the curve at higher speeds because the proper vehicle travelling speed is calculated as the speed of a vehicle capable of passing the curve with lateral acceleration whose value is not greater than a preset reference value. When the curvature radius is great, it is easier for the vehicle to pass through the curve and the proper vehicle travelling speed is naturally increased.

In the case of a front engine front drive type vehicle, for example, the vehicle speed detecting means M3 detects the vehicle speed based on the number of rotations of rear wheels as driven wheels.

The deceleration setting means M4 sets the deceleration at the time when automatic braking needs to be executed in order to let the vehicle pass the curve. The deceleration setting means M4 sets two kinds of decelerations under instructions from the area setting means M8. In other words, a reference deceleration is set to 0.2 G when a driver selects a high frictional road surface area whose road surface friction coefficient ranges from 0.8 G–0.3 G, when calculated in terms of gravitational acceleration, by actuating a selection switch (not shown). A reference deceleration is set to 0.12 G when a driver selects a low frictional road surface area whose road surface friction coefficient ranges from 0.4 G–0.15 G, as shown in FIG. 4. The high and low frictional road surface areas overlap in the range of 0.4 G–0.3 G.

The road surface friction detecting means M6 brakes only front wheels when rear wheels are not braked at the initial automatic braking time, and detects the road surface friction coefficient based on the deviation at that time between the number of rotations of the front wheel and that of the rear wheel. In other words, the front wheel which is braked slips in accordance with the road surface friction coefficient and the number of rotations of the front wheel lowers, though the rear wheel which is not braked rotates at the same speed as the vehicle speed. More specifically, the front wheel easily slips on the road surface with the low road surface friction coefficient and the number of its rotations greatly lowers and since the deviation of the number of rotations of the front wheel from that of the rear wheel increases, the road surface friction coefficient can be detected based upon this deviation. It is possible for the front wheel to be braked strongly while the rear wheel is only slightly braked, as opposed to braking only the front wheel at the initial braking stage. However, the calculation of the road surface friction coefficient is very complicated in comparison to the situation discussed previously where only the front wheel is braked.

The deceleration correcting means M7 corrects the deceleration as the reference based on the road surface friction coefficient detected by the road surface friction detecting means M6. While the high frictional road surface area is selected by the area setting means M8, as shown in FIG. 4, the deceleration is increased from 0.2 G as the reference deceleration in the high frictional road surface area up to 0.3 G linearly as the detected road surface friction coefficient lowers from 0.8 G. When the low frictional road surface area is selected by the area setting means M8, the deceleration is increased from 0.12 G as the reference deceleration in the low frictional road surface area to 0.15 G as the detected road surface friction coefficient reduces from 0.4 G.

The brake control means M5 compares the proper vehicle travelling speed calculated in the proper vehicle travelling speed calculating means M2 with the presumed vehicle travelling speed, which is calculated from the vehicle speed detected by the vehicle speed detecting means M3. If the presumed vehicle travelling speed is greater than the proper vehicle travelling speed, the brake control means M5 executes automatic braking at the deceleration, including the corrected deceleration, set in the deceleration setting means M4, to ensure that the vehicle passes a curve. The presumed vehicle travelling speed is a presumed vehicle speed at each node based on the assumption that the driver voluntarily applies the brake. The automatic braking of the vehicle is effected by operating the brake system by an actuator.

Referring to the flowchart of FIG. 2, a description will follow of a case where the high frictional road surface area is selected by the area setting means M8. The same description will apply to a case where the low frictional road surface area is selected by the area setting means M8.

A road shape in front of the vehicle position is detected in the road shape detecting means M1 at Step S1; then, a proper vehicle travelling speed at each node on the forward road is calculated by the proper vehicle travelling speed calculating means M2 at Step S2. The presumed vehicle travelling speed when the vehicle passes each node on the forward road is calculated on the basis of the vehicle speed detected in the vehicle speed detecting means M3 at Step S3, and compared with the proper vehicle travelling speed at Step S4. If the result of comparison proves that the presumed vehicle travelling speed is greater than the proper vehicle travelling speed, automatic braking is judged necessary in order to successfully negotiate the forward road; automatic braking is then started at Step S5. Then, a road surface friction coefficient is detected as described above in the road surface friction detecting means M6 at Step S6.

Since the high frictional road surface area is subsequently set by the area setting means M8 at Step S7, automatic braking is effected by the brake control means M5, based on the deceleration set in the deceleration setting means M4 or the deceleration corrected in the deceleration correcting means M7 at Step S8.

Figure 3A:
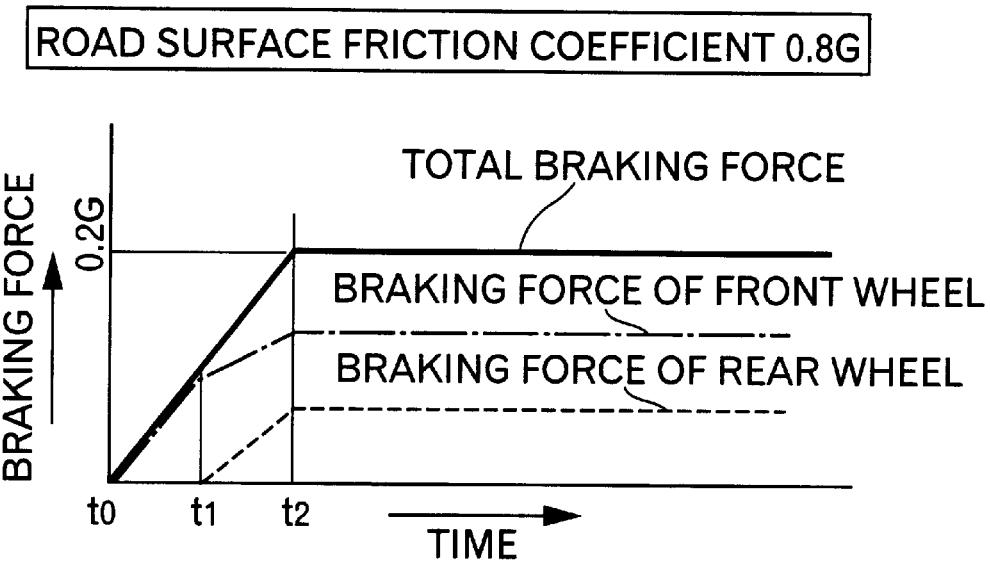
FIG. 3 is a graph illustrating the deceleration during automatic braking.

When the high frictional road surface area is set, as shown in FIG. 3A, automatic braking is started at time to and a road surface friction coefficient is calculated by braking only the front wheel up to time $t_1$. Consequently, if the detected road surface friction coefficient corresponds to a point a (0.8 G) in the graph of FIG. 4, the deceleration at that time is set at 0.2 G. The deceleration 0.2 G is the value set in the deceleration setting means M4, and is made free from any correction in the deceleration correcting means M7. When the time $t_1$ is reached, the braking force of the rear wheel is activated and by decreasing the increasing ratio of the braking force of the front wheel, the sum of the braking force of both the wheels is increased linearly from time $t_0$ to the time $t_1$. At time $t_2$, the sum of the braking force of both the wheels reaches 0.2 G, which is the deceleration set previously, the braking force of both the wheels is set to continue braking at a deceleration of 0.2 G.

Figure 3B:
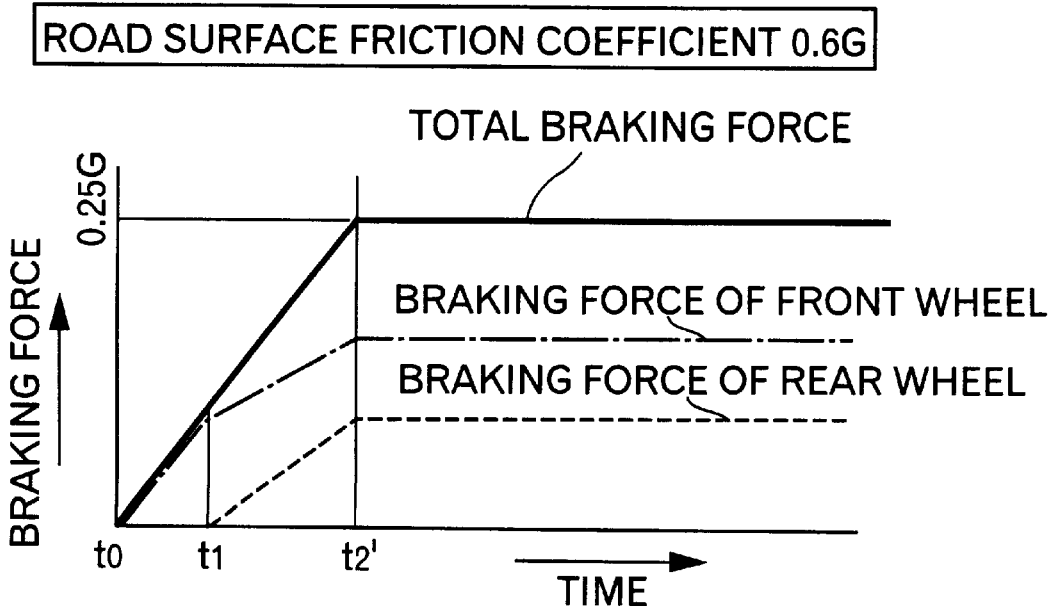

Referring to FIG. 3B, when a road surface friction coefficient resulting from braking only the front wheel corresponds to a point b (0.6 G) in the graph of FIG. 4 at time $t_0$, the deceleration is corrected from 0.2 G to 0.25 G. In other words, when a road surface friction coefficient lower than 0.8 G is detected as the upper limit of the high frictional road surface area, the deceleration correcting means M7 corrects the reference deceleration from 0.2 G in a direction in which the deceleration is increased in accordance with an increase in the deviation between the detected deceleration and 0.8 G. When time $t_1$ is reached, the sum of the braking force of both the wheels is increased linearly by activating the braking force of the rear wheel until the sum of braking force of both the wheels reaches 0.25 G at $t_2'$, then the braking force of both the wheels is set so that the braking at 0.25 G is continued.

Since the deceleration is thus corrected in the direction in which it is increased as the detected road surface friction coefficient decreases, the vehicle speed is satisfactorily reducible at such time as the vehicle reaches a forward curve, and the vehicle reaches the curve at such a speed so as to successfully and safely negotiate the curve even on a slippery road. Therefore, it becomes unnecessary to advance the starting of the automatic braking procedure, thereby avoiding or reducing driver distress caused by a disturbing or unexpected automatic braking characteristics. Further, the behavior of the vehicle subjected to braking can be stabilized by setting the braking force of the front wheel greater than that of the rear wheel. The deceleration varies linearly with the change of the road surface friction coefficient, thereby avoiding or reducing driver distress which could be caused by a sudden change in the deceleration.

In a situation where the low frictional road surface area is set in FIG. 4, the deceleration as the reference is set at 0.12 G, which is lower than 0.2 G as the reference deceleration set when the high frictional road surface area is set. The deceleration 0.12 G is set so that it increases only slightly even when the road surface friction coefficient decreases; this is intended to avoid correcting the deceleration to an unnecessarily large extent based on an inaccurate road surface friction coefficient. Since the road surface friction coefficient greatly varies with the relationship of the tire and the road, such as whether or not the tire is riding in a wheel track, it is difficult to detect an accurate road surface friction coefficient in a low frictional road surface area such as on a snowy road, a road covered with compressed or packed snow, or a frozen road. If the deceleration is increased on the low frictional road surface area, slipping or skidding may occur when deceleration is carried out, even before any curve is reached. It is possible to achieve maximum deceleration without the wheel slipping at the time of deceleration by setting the deceleration as a reference slightly higher in the high frictional road surface area and slightly lower in the low frictional road surface area.

Since the high frictional road surface area and the low frictional road surface area are set in such a way that both of them overlap, problems are avoided when the area setting means M8 selects either high frictional road surface area or low frictional road surface area in a section where road surface friction coefficients 0.4 G–0.3 G overlap. Influence of improper setting or mis-setting is therefore minimized.

In the first embodiment of the present invention as discussed above, the road shape detecting means M1 has been used for detecting the road shape based on the road data stored in the storage means M9 and the vehicle position detected in the vehicle position detecting means M10. In another embodiment, imaging means M11 (see FIG. 1) such as a CCD camera or a similar device installed in the vehicle may be used for imaging a forward road. Road shape detecting means M1 may then be used for detecting the road shape based on the imaged road shape. Also road shape detecting means M1 may detect the road shape based upon road data transmitted from the information transmitting means M12 (see FIG. 1) such as a leakage coaxial cable, or beacons installed along a road.

Although the switch operated by the driver is used to set the high frictional road surface area and the low frictional road surface area according to this embodiment of the present invention, they may be set automatically in accordance with the road surface friction coefficient detected by another simple detection means other than the road surface friction detecting means M6. Such a road surface friction coefficient may be detected by the use of, for example, a microphone for picking up and analyzing road noise after frequency analysis. In this case, the frequency analysis is made possible by detecting data on the specific frequency derived from an asphalt-paved road, a graveled-road, a wet road surface, a snowy road or the like, or otherwise by detecting the strength of waves reflected from the road surface by means of a sonar.

Furthermore, according to this embodiment of the present invention, the deceleration has been corrected in the direction in which it is slightly increased in accordance with a reduction in the road surface friction coefficient in the low frictional road surface area. However, the deceleration may be fixed to a predetermined value. In this way, the deceleration is prevented from being improperly increased under control when the accurate road surface friction coefficient cannot be obtained.

Although a detailed description has been given on the embodiment of the present invention, the invention may be modified in a number of ways without departing from the spirit and scope thereof. The scope of the invention is to be determined based upon the appended claims.

What is claimed is:

1. An automatic brake system for a vehicle, comprising:
   road shape detecting means for detecting a road shape in a forward direction of a vehicle;
   proper vehicle travelling speed calculating means connected to said road shape detecting means for calculating a proper vehicle travelling speed in the forward direction, based on the road shape detected;
   vehicle speed detecting means for detecting a speed of the vehicle;
   deceleration setting means for setting a vehicle deceleration; and
   brake control means connected to said deceleration setting means, said vehicle speed detecting means, and said proper vehicle travelling speed calculating means for reducing the vehicle speed according to the vehicle deceleration to the proper vehicle travelling speed based on a result of comparing the proper vehicle travelling speed with the vehicle speed, said system further comprising
   road surface friction detecting means for detecting a value corresponding to a slippery condition of a road surface; and
   deceleration correcting means connected to said road surface friction detecting means for increasing the deceleration as the road surface becomes slippery.

2. An automatic brake system according to claim 1, further comprising area setting means connected to said deceleration setting means for setting a range of values corresponding to a high frictional road surface area and a low frictional road surface area in such a way that the range of values overlap,
   wherein the deceleration setting means sets a deceleration in the high frictional road surface area and another deceleration in the low frictional road surface area.

3. An automatic brake system according to claim 2, wherein an increase in the deceleration in the low frictional road surface area is set smaller than an increase in the deceleration in the high frictional road surface area.

4. An automatic brake system according to claim 2, wherein the deceleration in the low frictional road surface area is set at a constant value.

5. An automatic brake system according to claim 1, wherein when the road surface friction detecting means detects the slippery condition of the road surface, the brake control means sets a braking force of front wheels to be greater than a braking force of rear wheels.

6. An automatic brake system according to claim 5, wherein the brake control means sets the braking force of the rear wheels to zero.

7. An automatic brake system according to claim 1, further comprising storage means connected to the road shape detecting means, wherein the road shape detecting means detects the road shape based on road information stored in the storage means.

8. An automatic brake system according to claim 7, further comprising vehicle position detecting means for detecting a position of the vehicle relative to the road, and wherein the road shape detecting means detects the road shape based upon the road information stored in the storage means and the vehicle position detected by the vehicle position detecting means.

9. An automatic brake system according to claim 1, further comprising imaging means connected to said road shape detecting means for providing image data of the road ahead of the vehicle to said road shape detecting means, said road shape detecting means detecting the road shape based upon the image data.

10. An automatic brake system according to claim 1, further comprising receiving means connected to the road shape detecting means for receiving road shape data from information transmitting means installed on the road, said road shape detecting means determining the road shape based on information from said receiving means.

11. A method for automatic braking of a vehicle, said method comprising the steps of:
    detecting a road shape in a forward direction of a vehicle;
    calculating a proper vehicle travelling speed for the road shape detected;
    detecting a speed of the vehicle;
    setting a vehicle deceleration based upon a comparison of the detected vehicle speed to the proper vehicle travelling speed;
    actuating a vehicle brake to reduce the vehicle speed according to the vehicle deceleration such that said vehicle speed is reduced to the proper vehicle travelling speed;
    detecting a slippery condition of a road surface based upon feedback data from said actuation of said vehicle brake;
    correcting the deceleration based upon the detected slippery condition of the road surface.

12. A method for automatic braking as recited in claim 11, wherein said step of setting the vehicle deceleration includes a step of setting a range of values corresponding to a high frictional road surface area and a low frictional road surface area, wherein the range of values overlap, and wherein the vehicle deceleration is set in the high frictional road surface area and the low frictional road surface area.

13. A method as recited in claim 12, wherein said correcting step is such that an increase in the deceleration in the low frictional road surface area is smaller than an increase in the deceleration in the high frictional road surface area.

14. A method as recited in claim 12, wherein the step of setting the deceleration includes a step of setting the deceleration in the low frictional road surface area to a constant value.

15. A method as recited in claim 11, wherein the step of detecting the slippery condition of the road surface includes a step of setting a braking force of front wheels of the vehicle to be greater than a braking force of rear wheels of the vehicle.

16. A method as recited in claim 15, wherein the braking force of the rear wheels is set to be zero.

17. A method as recited in claim 11, wherein said method comprises a first step of providing a storage means for storing road information data, wherein the step of detecting the road shape includes a step of reading the road information from the storage means.

18. A method as recited in claim 17, wherein said step of detecting a road shape includes a step of detecting a vehicle position based upon the road information in the storage means.

19. A method as recited in claim 11, wherein said step of detecting a road shape includes a step of generating an image of the road ahead of the vehicle through data provided by an image generating device.

20. A method as recited in claim 11, wherein said step of detecting a road shape includes a step of receiving road shape data from remote information transmitting means, said road shape being determined based on said road shape data.

21. An automatic brake system for a vehicle, comprising:

a road shape detecting device for detecting a road shape in a forward direction of a vehicle;

a proper vehicle travelling speed calculating device connected to said road shape detecting device for calculating a proper vehicle travelling speed in the forward direction, based on the road shape detected;

a vehicle speed detecting device for detecting a speed of the vehicle;

a deceleration setting device for setting a vehicle deceleration; and a brake control device connected to said deceleration setting device, said vehicle speed detecting device, and said proper vehicle travelling speed calculating device, for reducing the vehicle speed according to the vehicle deceleration to the proper vehicle travelling speed based on a result of comparing the proper vehicle travelling speed with the vehicle speed; said system further comprising a road surface friction detecting device for detecting a value corresponding to a slippery condition of a road surface; and a deceleration correcting device connected to said road surface friction detecting device for increasing the deceleration as the road surface becomes slippery.

22. An automatic brake system according to claim 21, further comprising an area setting device connected to said deceleration setting device for setting a range of values corresponding to high frictional road surface area and a low frictional road surface area in such a way that the range of values overlap, wherein the deceleration setting device sets the deceleration in the high frictional road surface area and the deceleration in the low frictional road surface area.

23. An automatic brake system according to claim 22, wherein an increase in the deceleration in the low frictional road surface area is set smaller than an increase in the deceleration in the high frictional road surface area.

24. An automatic brake system according to claim 22, wherein the deceleration in the low frictional road surface area is set at a constant value.

25. An automatic brake system according to claim 21, wherein when the road surface friction detecting device detects the slippery condition of the road surface, the brake control device sets a braking force of front wheels to be greater than a braking force of rear wheels.

26. An automatic brake system according to claim 25, wherein the brake control device sets the braking force of the rear wheels to zero.

27. An automatic brake system according to claim 21, further comprising a storage device connected to the road shape detecting device, wherein the road shape detecting device detects the road shape based on road information stored in the storage device.

28. An automatic brake system according to claim 27, further comprising a vehicle position detecting device for detecting a position of the vehicle relative to the road, and wherein the road shape detecting device detects the road shape based upon the road information stored in the storage device and the vehicle position detected by the vehicle position detecting device.

29. An automatic brake system according to claim 21, further comprising an imaging device connected to said road shape detecting device for providing image data of the road ahead of the vehicle to said road shape detecting device, said road shape detecting device detecting the road shape based upon the image data.

30. An automatic brake system according to claim 21, further comprising a receiving device connected to the road shape detecting device for receiving road shape data from information transmitting devices installed on the road, said road shape detecting device determining the road shape based on information from said receiving device.

* * * * *